March 2, 1926.
W. H. BRUESEKE
1,574,788
ICE CREAM LADLE
Filed Sept. 25, 1922
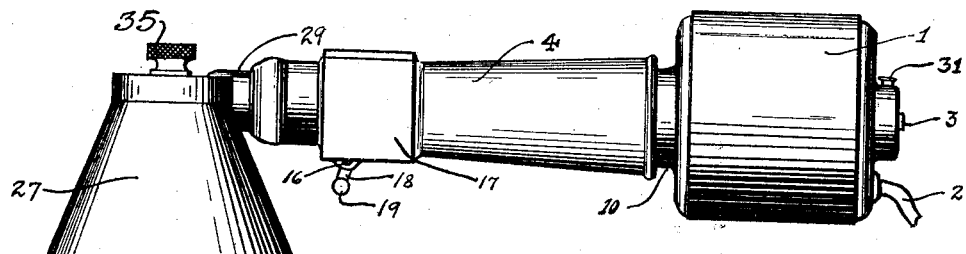
Fig. 1
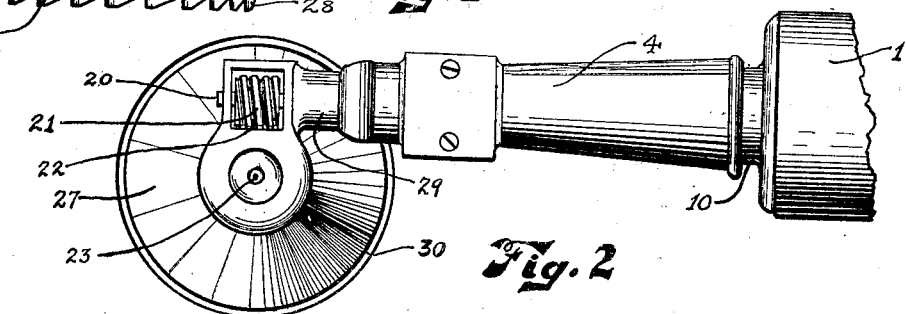
Fig. 2
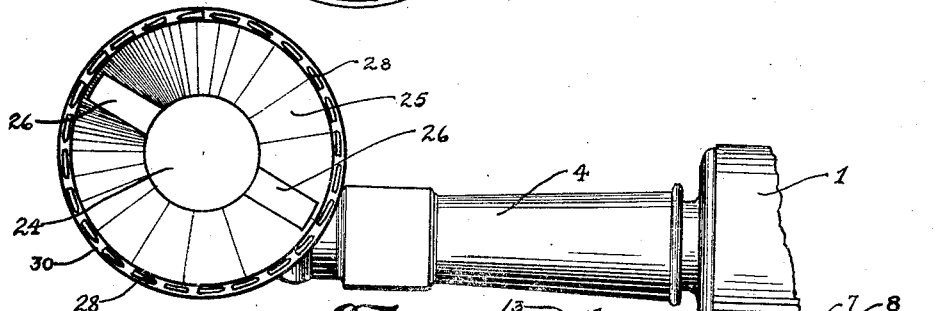
Fig. 3
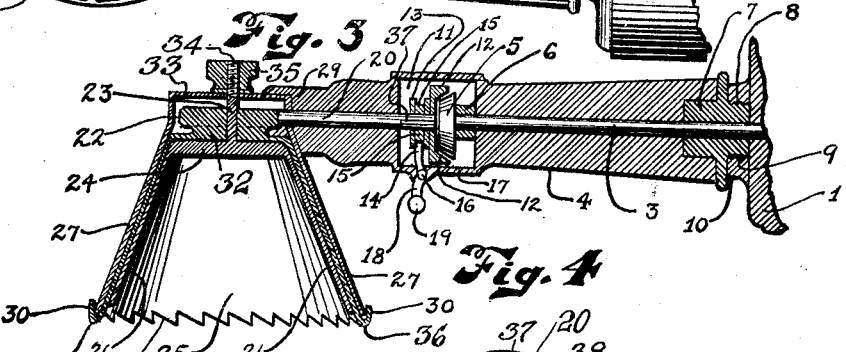
Fig. 4
Fig. 5
INVENTOR:
William H. Brueseke,
BY
Hugh H. Wagner,
ATTORNEY.

Patented Mar. 2, 1926.

1,574,788

UNITED STATES PATENT OFFICE.

WILLIAM H. BRUESEKE, OF ST. LOUIS, MISSOURI.

ICE-CREAM LADLE.

Application filed September 25, 1922. Serial No. 590,242.

*To all whom it may concern:*

Be it known that I, WILLIAM H. BRUE-SEKE, a citizen of the United States, residing at the city of St. Louis, in the State of Missouri, have invented certain new and useful Improvements in Ice-Cream Ladles, of which the following is a specification.

This invention is intended to save manual labor and facilitate the work in the filling of ice cream cones or dishes at places where the sales are numerous. At such places the labor of scooping ice cream by hand and filling it into cones or dishes is very arduous, due to the nature of the material and the fact that it often occurs that customers are so numerous as to require the attendant to work constantly to supply the demand.

This device alleviates the strain on the muscles of the attendant by providing mechanical help for his service.

In the accompanying drawings forming part of this specification, in which like numbers of reference denote like parts wherever they occur, Figure 1 is a side elevation;

Figure 2 is a top plan view;

Figure 3 is a bottom plan view;

Figure 4 is a longitudinal sectional view; and

Figure 5 is an end view of the cone clutch.

A small electric motor 1 energized through the cable 2, drives shaft 3, located in handle 4. Male cone 5 is mounted on shaft 3 and driven thereby. Shaft 3 is journaled in blocks 6 and 7. The outer end of block 7 is screw-threaded at 8, and, by means thereof and internal threads 9 in collar 10, the motor 1 is attached to handle 4.

A chamber 11 is formed in any suitable manner within handle 4, and receives therein block 6, cone 5; female cone 12, and clutch-collar 13. Collar 13 and cone 12 are in fixed relation, and preferably formed integral; and rotate with shaft 20, but are slidable longitudinally thereon, by reason of the conventional tongue and groove connection, the tongues 37 of which are integral with shaft 20 and engage slots 38 in clutch member 12. A fork or trigger 14 fits within groove 15 in block 13. Fork 14 is pivoted at 16 in the wall 17 of chamber 11, and a finger 18 bearing a knob 19 projects below handle 4, so as to be readily accessible to manipulation by the finger and thumb or one of them of the operator.

By moving finger 18 in one direction engagement is produced between cones 5 and 12, with consequent rotation of shaft 20 and worm 21 actuated thereby. Worm 21 matches with gear 22 and drives the same.

Gear 22 is rigidly connected to, and preferably formed integral with, the floor 32 of internal and preferably cone-shaped bowl 25, and floor 24 is, also, preferably integral with straps 26. Bowl 25 is rotatable relative to the housing or exterior, and preferably cone-shaped, bowl 27, being thus rotatable by reason of gear 22, being rigidly connected therewith and driven by shaft 20.

A stem 23, preferably integral with floor 24, projects centrally upward through floor 32 and gear 22 and floor 33 and is externally threaded at its upper end 34 for the reception of a tightly-fitting nut 35.

Cone 27 is in fixed connection with the inner end 29 of handle 4. The bottom edge of cone 25 is bent over at 36 to form a flange 30, which surrounds the lower edge of cone 27. Cone 25 and flange 30 are provided with serrations or teeth 28 at 36, which cause it to cut through and into the ice-cream when rotated.

The motor 1 revolves all the time except when cut off by a switch 31. When the scoop formed of cones 25 and 27 is not being pressed into the ice cream, the operator by pressure on finger 18 will detach cones 5 and 12 from each other by movement of the latter away from cone 5; but when the scoop is being pressed into the ice cream, and it is desired to facilitate cutting thereinto by rotation of cone 25 and its teeth 28, the operator will move cone 12 into the opposite direction, so as to engage cone 5, thus transmitting the operation of the motor and the rotation of shaft 3 to shaft 20 and worm 21 and gear 22 and cone 25. Cone 25, straps 26 and nut 35 normally rotate together but when it is desired to discharge the contents of the scoop, nut 35 is grasped to prevent its turning, and consequently prevent straps or fingers 26 from rotating, with the cone 25, so that the fingers 26 ride on the cone 25 and scrape the contents therefrom. The ejection may, also, be effected, though not as readily, by disengaging the cone clutch, so that cone 25 remains stationary, and then turning nut 35 and with it fingers 26.

Since the material handled by this device is moist it may be found objectionable to mount the motor 1 directly on the handle 4, but the same can be connected by a flexible shaft between the motor 1 and the shaft 3 within the handle 4.

The straps 26 are preferably soldered, but may be otherwise attached to the floor 24. The cone 27 forms a housing and resistance for cone 25, so that when pressure is applied to force the ice cream into cone 25 it is pressed against cone 27 and handle 4.

Having thus described this invention, I hereby reserve the benefit of all changes in form, arrangement, order, or use of parts, as it is evident that many minor changes may be made therein without departing from the spirit of this invention or the scope of the following claims.

I claim:

1. A device of the character described, comprising a handle, a scoop rotatably mounted at one end of said handle, a driven shaft geared to said scoop to rotate the same and extending longitudinally of said handle, a driving shaft extending in said handle in alinement with the driven shaft, said handle having a chamber therein at the adjacent ends of said shafts, and clutch means in said chamber for connecting and disconnecting said shafts and provided with operating means projecting laterally from the handle.

2. In a device of the character described, a handle having a bore extending there through and provided immediate its ends with a chamber wherewith the respective portions of the bore communicate, a frusto conical head fixed on one end of the handle, a revolvable scoop member fitted within said head, a driven shaft fixed within the bore of the handle adjacent said head and projecting into the chamber at one end, gearing connecting the driven shaft and scoop member at the head, a driving shaft fitted within the bore at the end remote from the head, said driving shaft projecting into said chamber, a clutch device within the chamber for connecting the driven and driving shafts, and means projecting laterally from the chamber for actuating said clutch device.

3. In a device of the character described, a handle having a bore extending there through and provided immediate its ends with a chamber wherewith the respective portions of the bore communicate, a frusto conical head fixed on one end of the handle, a revolvable scoop member fitted within said head, a driven shaft fixed within the bore of the handle adjacent said head and projecting into the chamber at one end, gearing connecting the driven shaft and scoop member at the head, a driving shaft fitted within the bore at the end remote from the head, said driving shaft projecting into said chamber, a clutch device within the chamber for connecting the driven and driving shafts, means projecting laterally from the chamber for actuating said clutch device, clearing fingers bearing against the walls of the scoop member, and means carried by the head for manually rotating the clearing finger.

In testimony whereof I hereunto affix my signature.

WILLIAM H. BRUESEKE.